United States Patent [19]

Huang et al.

[11] Patent Number: 5,750,892
[45] Date of Patent: May 12, 1998

[54] LAMINAR FLOW ELEMENT WITH INBOARD SENSOR TAPS AND COAXIAL LAMINAR FLOW GUIDES

[75] Inventors: Yufeng Huang, Chesapeake; William J. Alvesteffer; Ronald A. Outlaw, both of Newport News, all of Va.

[73] Assignee: Teledyne Industries, Inc., Los Angeles, Calif.

[21] Appl. No.: 720,025

[22] Filed: Sep. 27, 1996

[51] Int. Cl.[6] .................................................. G01F 5/00
[52] U.S. Cl. ........................................................ 73/202
[58] Field of Search ............................................ 73/202

[56] References Cited

U.S. PATENT DOCUMENTS

| | | | |
|---|---|---|---|
| 4,100,801 | 7/1978 | LeMay | 73/202 |
| 4,800,754 | 1/1989 | Korpi | 73/202 |
| 4,961,344 | 10/1990 | Rodder | 73/202 |
| 5,295,394 | 3/1994 | Suzuki | 73/202 |
| 5,332,005 | 7/1994 | Baan | 73/202 |
| 5,357,793 | 10/1994 | Jouwsma | 73/202 |

*Primary Examiner*—George M. Dombroske
*Assistant Examiner*—Jewel V. Artis
*Attorney, Agent, or Firm*—Calfee, Halter & Griswold LLP

[57] ABSTRACT

A laminar flow element for use in flow metering devices has a laminar flow element plug with an upstream end and a downstream end and a linear extent between the upstream end and the downstream end, the laminar flow element plug configured to be positioned within a base cavity with the upstream end oriented toward the direction of flow, and sensor taps through walls of the base cavity positioned inboard of the laminar flow element plug so that entrance effect is eliminated, error due to flow cross-sectional area differential is eliminated, and orifice effect is minimized, to produce a laminar flow with linear pressure drop across the sensor taps as a function of flow rate. Coaxial laminar flow guides are fixed coaxially about at least a portion of the length of the laminar flow element plug to increase the number of flow passages to enable linear measurements of higher flow rates.

13 Claims, 4 Drawing Sheets

LAMINAR FLOW ELEMENT WITH INBOARD SENSOR TAPS AND COAXIAL LAMINAR FLOW GUIDES

FIELD OF THE INVENTION

The present invention pertains generally to measurement of fluid flow and, more in particular, to measurement of mass or volumetric flow rate of a fluid.

BACKGROUND OF THE INVENTION

Laminar flow elements (LFE) are widely used in all types of flow meter devices including mass or volumetric flow meters and flow controllers. As represented by FIG. 1, for example, a mass flow meter (MFM) consists of a base B (also referred to as a flow meter body) connected to a fluid flow line L, a sensor S, a laminar flow element or shunt (LFE) and printed circuit board (PCB). The sensor S is typically a piece of straight or bent tube connected to the base B at an upstream tap UT and a downstream tap DT, -and with a heating coil H on it between the two taps. This type of sensor can typically measure gas flow up to approximately 10 sccm (standard cubic centimeters per minute). For higher flow rates, the LFE is needed to pass most of the flow while a small portion of the flow is directed through the sensor tube. The total flow rate is calculated based on the measured sensor flow and the flow ratio between the sensor and the LFE.

A linear MFM has an output signal which is linearly proportional to the flow. An MFM that is constructed using a linear sensor and has a linear flow division between the sensed flow and the shunted flow will be a linear device. For low flow (<10 sccm), the sensor output signal is usually linear with flow rate. Linear flow division means that the flow division between the sensor and the shunt remains constant regardless of flow rate. Linear flow division will occur if the volumetric flow vs pressure drop of both the shunt and the sensor are linearly proportional to each other. Most of the current MFMs in the market do not have a linear flow division, and their outputs are normally linearized electronically at the expense of complicated circuitry and costly calibration labor. Electronically linearized calibrations could shift for different gases and backpressures because of the non-linear flow division. Accordingly, a linear flow division is essential in a inherently linear mass flow device.

Most sensors are constructed of a long thin sensor tube that has a pressure drop that is linearly proportional to the volumetric flow through it. A linear flow division for a sensor of this type can be achieved by designing a flow shunt that has a pressure drop that is linearly proportional to the volumetric flow rate through it.

The linearity of pressure drop (DP) vs volumetric flow for a flow passage is determined by its flow dynamics. DP is a sum of four different functions of volumetric flow, one of which is linear with respect to volumetric flow and the other three are non-linear. The non-linear portions are the orifice effect (DPO), a change of cross-sectional area effect (DPa) and entrance effect (DPe). The linear portion of the pressure drop (DP$_s$) is contributed by surface friction of the laminar flow.

$$DP = DP_s + DP_a + DP_o + DP_e \quad (1)$$

Since a shunt will consist of one or more flow passages, a linear shunt requires DP$_a$, DP$_o$ and DP$_e$ be minimized for each passage.

By energy conservation law, the total energy of the fluid, which includes kinetic energy ($\frac{1}{2}\rho V^2$) and pressure energy (P), remains constant. In the above, $\rho$ is the fluid's density and V is the mean velocity; and P is the pressure. A change of cross-sectional area in duct flow results in a change in fluid's mean velocity (V), which effects the pressure (P). The pressure drop (DP$_a$) due to area change is indicated by $$DP_a \sim \rho Q^2, \quad (2)$$

Where Q is the volumetric flow rate.

DP$_a$ is not desirable in mass flow measurement because (i) DP$_a$ is nonlinear with flow rate (Q), and (ii) DP$_a$ is density ($\rho$) dependent. A nonlinear DP$_a$ indicates a varying flow division between the sensor and the shunt, and it also changes for different gases and backpressures. To minimize DP$_a$, the cross-sectional area at the sensor inlet (Upstream) must be exactly the same as the cross-sectional area at the sensor outlet (Downstream).

FIG. 2 illustrates a conical LFE design in which pressure drop (DP) is adjusted by changing the position of the LFE relative to the MFM base, which changes the flow clearances (C$_a$ and C$_b$.) Note that the flow cross-sectional area at the upstream tap UT and downstream tap DT of the LFE is different, i.e., $2\pi \cdot D \cdot C \neq 2\pi \cdot d \cdot c$, where D and d are the diameters of the LFE at the upstream and downstream taps, respectively. Furthermore, the annular conical cross-sectional area changes at different points along the flow path. Thus, this type of conical LFE design results in a nonlinear device.

Fluid flow is usually classified as two categories—laminar flow and turbulent flow. The criterion depends on a non-dimensional group called Reynolds number, $$R_e = \frac{VL}{\nu},$$

where V is fluid's mean velocity; L is characteristic length and $\nu$ is fluid's kinematic viscosity. If R$_e$ is below a certain value (i.e., critical Reynolds Number, Re$_{cr}$), the flow is laminar; if R$_e$ is above Re$_{cr}$, the flow is turbulent. Re$_{cr}$ is dependent on the wall smoothness. For example, turbulence may occur and create significant pressure drop at a joint of two different-sized ducts, such as a small orifice. The correlation for DP$_o$ is, $$DP_o \sim \rho Q^2 \quad (3)$$

DP$_o$ is not desirable in mass flow measurement because (i) DP$_o$ is nonlinear with flow rate, and (ii) DP$_o$ is density ($\rho$) dependent.

For most of the previous shunt technologies, such as Hastings Instruments' LFE and Brooks' 5850E MFC's, sensor tubes are tapped outside LFEs as shown in FIG. 1. The turbulence at the entrance and exit of the LFEs for high flow rate makes the pressure drop (DP) nonlinear.

Linear pressure drop is only valid for one-dimensional, steady and fully developed laminar flow, such as gas flow in a very long duct. However, this is not the case near the entrance. At the entrance, there is a transition section, where flow starts to develop. After a certain length (L$_e$), the flow becomes stable laminar flow. The pressure drop within the entrance length (L$_e$) is not linear.

The entrance length ($L_e$) is correlated by, $$\frac{L_e}{D_h} = \frac{1}{f} \left[ \left( \frac{u_{max}}{V} \right)^2 - 1 - k_L \right], \quad (4)$$

where f is friction factor; $D_h$ is the hydrodynamic diameter of the flow passage; $u_{max}$ is the fluid's maximal velocity; V is the mean velocity and $k_L$ is a known correction term for entrance effect.

In previous LFE technologies, the sensor tubes are tapped outside or too close to the entrance of the flow channel of the LFEs where entrance effect exists and thus makes the pressure drop (DP) nonlinear.

Pressure drop is determined by the flow conductance of LFE. An LFE with high flow conductance results in low pressure drop, which is desirable in many applications of MFMs/MFCs, such as leak detection. The flow conductance of a certain geometric passage is determined by the hydrodynamic diameter ($D_h$), which is defined by $$D_h = \frac{4A}{P}, \quad (5)$$

where A and P are, respectively, the cross-sectional area and perimeter of the flow passage. $D_h$ can be understood as the "effective" flow clearance. The larger the $D_h$, the higher the flow conductance, and the lower the pressure drop for a certain flow rate.

Triangular and circular shunt flow passage configurations are widely used by many MFM/MFC manufacturers, such as the Hastings Instruments shunt having small tubes with circular cross-sections, and the rectangular or polygon-shaped shunt designs of MKS and Brooks, in which the cross sections of flow passages are generally triangular. For triangular and circular shunts, the hydrodynamic diameters are only ⅔ c and c, respectively, where c is the height/diameter of the triangular/circular cross section of the flow passages.

SUMMARY OF THE PRESENT INVENTION

The present invention overcomes these and other disadvantages of the prior art by providing a laminar flow element for use in flow metering devices and wherein the sensor taps in a flow meter base are positioned inboard of the laminar flow element so that entrance effect is minimized or substantially eliminated at the sensor taps to provide a linear pressure drop as a function of volumetric flow rate to improve the linearity of a flow metering device.

In accordance with one aspect of the invention, a laminar flow element having inboard sensor taps includes a laminar flow element plug dimensioned to fit within a base cavity, the laminar flow element plug having an upstream end and a downstream end and a sufficient length so that upstream and downstream sensor taps in the base cavity are positioned between the upstream end and the downstream end of the laminar flow element plug.

In accordance with another aspect of the invention, a laminar flow element for use as in a flow metering device includes a laminar flow element plug configured to fit within a base cavity and having an upstream end and a downstream end, and at least one coaxial laminar flow guide positioned coaxially about the laminar flow element plug within the base cavity to define at least two laminar flow passages between the laminar flow element plug and the laminar flow guide, and between the laminar flow guide and the base cavity wall, and upstream and downstream sensor taps positioned between the upstream end and the downstream end of the outermost coaxial laminar flow guide. The cross sectional areas of each flow passage between the upstream sensor tap and downstream sensor tap are constant to avoid non-linear pressure drops.

In accordance with another aspect of the invention, a novel flow metering device includes a base having a base cavity and an inlet and an outlet to the base cavity, the base inlet and outlet connectable to a flow passage, a laminar flow element plug positioned within the base cavity and along a longitudinal axis of the base cavity to define a flow passage between the laminar flow element plug and interior walls of the base cavity, the laminar flow element plug having an upstream end and a downstream end, the upstream end oriented toward the inlet of the base cavity, and the downstream end oriented toward the outlet of the base cavity, an upstream sensor tap and a downstream sensor tap to the base cavity, the upstream sensor tap positioned in the base at a point between the upstream end and the downstream end of the laminar flow element plug, and the downstream sensor tap positioned in the base at a point between the upstream end and the downstream end of the laminar flow element plug, and means for sensing a pressure drop between the upstream sensor tap and the downstream sensor tap.

These and other aspects of the invention are herein described in detail with particular reference to the accompanying Figures. The Figures also include depictions of certain aspects of the prior art to aid in explaining the novelty of the invention.

DETAILED DESCRIPTION OF THE PREFERRED AND ALTERNATE EMBODIMENTS

Figure 1:
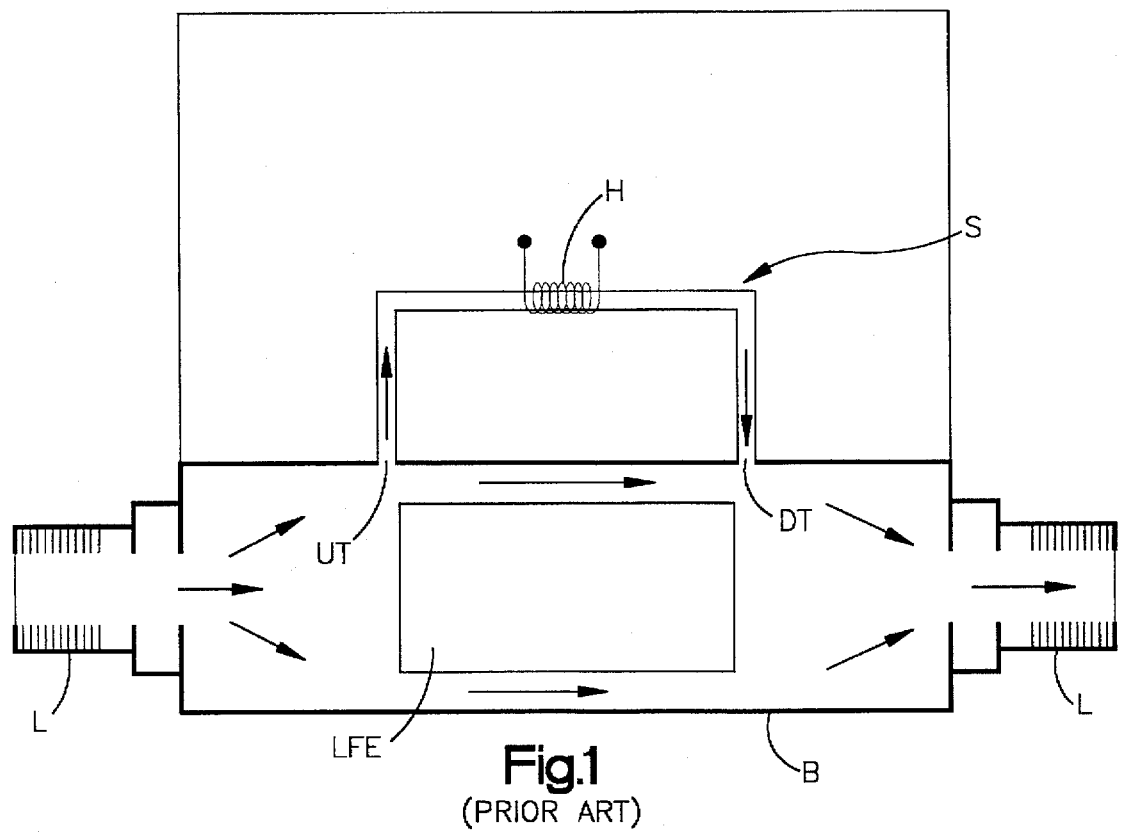
FIG. 1 is a cross-sectional illustration of a mass flow meter with a laminar flow element of the prior art.
Figure 2:
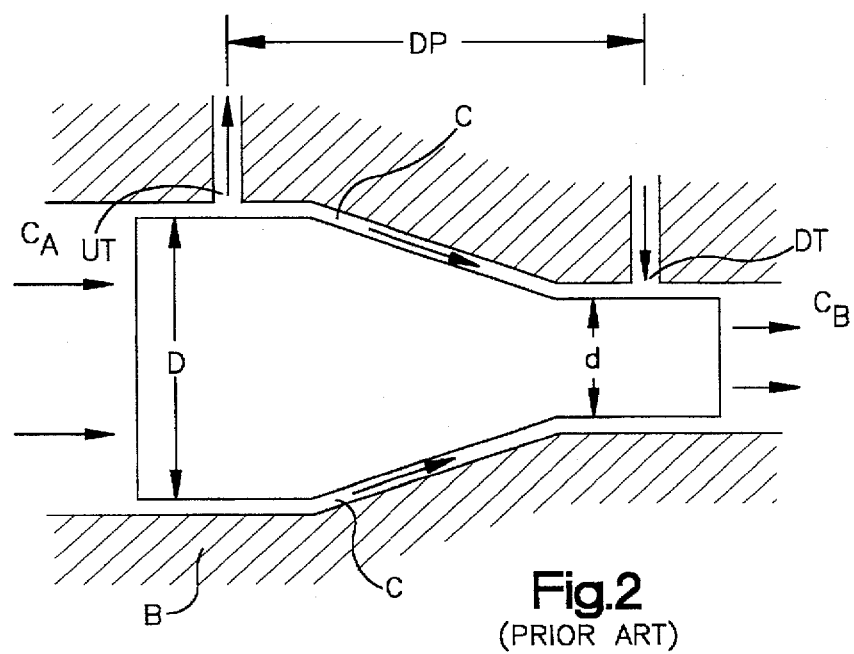
FIG. 2 is a cross-sectional illustration of a laminar flow element and sensor tap structure of a mass flow meter of the prior art.
Figure 3:
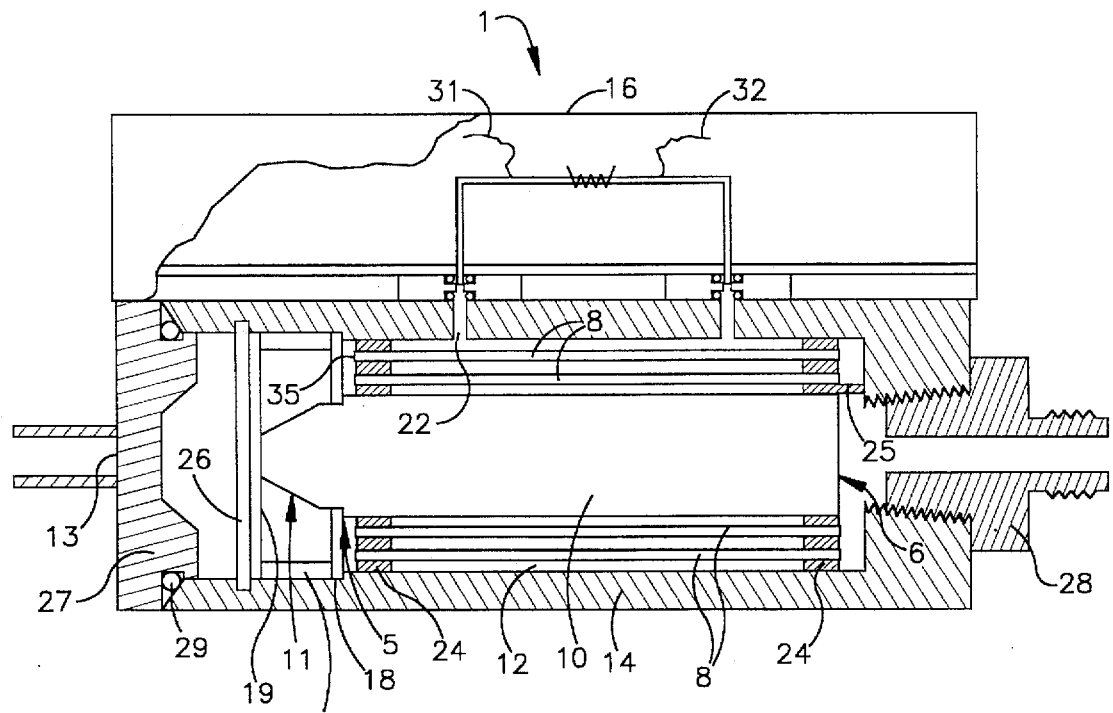
FIG. 3 is a cross-sectional illustration of a mass flow meter including a laminar flow element constructed in accordance with the present invention.

FIG. 3 illustrates a laminar flow element of the present invention in a mass flow meter, indicated generally at 1, which includes an elongate laminar flow element (LFE) plug 10 which is axially aligned within a base flow passage cavity 12 in a base 14. Base cavity 12 has an upstream inlet 13 and a downstream outlet 15 each connectable to a fluid line (not shown) such as a gas line connected to, for example, an atmospheric or fluid control system such as in connection with a chemical vapor deposition apparatus, or any other device or apparatus where it is desired to measure the mass or volumetric flow rate of a fluid. The laminar flow element 1 is also used as a flow shunt in thermal mass flow meters and mass flow controllers as described above.

The LFE plug 10 has an upstream end 5 and a downstream end 6. The LFE plug has a constant cross-sectional area from the upstream end 5 to the downstream end 6 and exits aligned coaxially with a longitudinal axis of base cavity 12. A conical tip 11 extends linearly from the upstream end 5 and projects through a screen washer 18, against the direction of fluid flow indicated and is positioned along the axis of the base cavity 12 by a screen disk 19, linearly spaced from the screen washer by a spacer 20.

A sensor tube 16 is tapped into the base cavity 12 at an upstream sensor tap 22 and a downstream sensor tap 23. Both the upstream sensor tap and the downstream sensor tap are positioned inboard of the LFE plug. In other words, the upstream tap 22 is positioned between the upstream end 5 and the downstream end 6 of the LFE plug, and the downstream tap 23 is positioned between the downstream end 6 and the upstream end 5 of the LFE plug, in order to eliminate pressure drop due to entrance effect which provides a linear pressure drop from upstream tap 22 to downstream tap 23. In other words, the sensor taps 22 and 23 are inboard of the LFE plug.

Although the laminar flow element is shown in FIG. 3 is in a MFM, it is understood that the LFE of the invention can be used in connection with any type of flow metering device having upstream and downstream sensor taps, and in connection with any type of pressure sensing device capable of measuring a pressure drop between an upstream sensor tap and a downstream sensor tap. For example, pressure transducers may be used at the upstream and downstream sensor taps in lieu of a sensor tube.

The laminar flow element of the invention may further include one or more coaxial laminar flow guides 8 coaxially disposed about the LFE plug 10 within the base cavity 12 to define one or more laminar flow passages $c_1$–$c_n$ between the LFE plug and the interior walls of the base cavity. The upstream and downstream taps are also positioned inboard of the coaxial laminar flow guides 8, with the distance from the upstream edge 35 of the outermost laminar flow guide to upstream tap 22 being greater than the entrance length calculated by Equation (4), as further described below. The coaxial laminar flow guides do not need to be equal in length, nor the same length, as the LFE plug 10. However, as shown in FIG. 3, that the cross-sectional area of each of the flow passages $c_1$–$c_n$ is constant between the upstream sensor tap 22 and the downstream sensor tap 23.

Figure 3A:
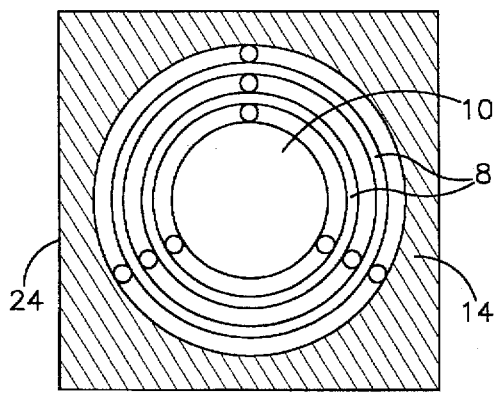
FIG. 3A is an axial cross-sectional illustration of an end of the laminar flow element of the present invention.
Figure 3B:
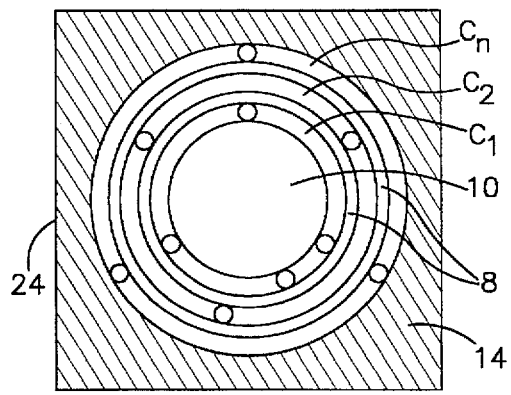
FIG. 3B is an axial view of an end of the laminar flow element of the present invention.

As further illustrated in FIGS. 3A and 3B, the coaxial laminar flow guides 8 are spaced from a longitudinal axis α of the LFE plug 10 by spacers 24 which fix each of the guides 8 at precise distances from the longitudinal axis of the LFE plug to define the width or radial dimension of the coaxial laminar flow passages $c_1$–$c_n$. Spacers 24 may be, for example, small pieces of metal wire with highly precise diameter, aligned with linear axes of the laminar flow guides, welded near both ends of the laminar flow guides, and the LFE plug, and may extend to an interior wall of the base near outlet 15, to coaxially align the laminar flow guides 8 about the LFE plug and to position the laminar flow element within the base flow passage cavity 12. The spacers 24 accurately and fixedly define the coaxial laminar flow passages $c_1$–$c_n$.

Figure 3C:
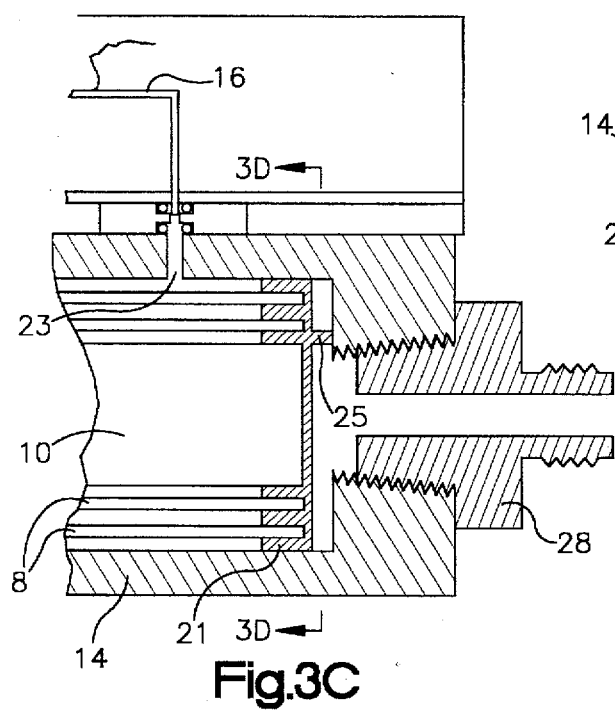
FIG. 3C is a cross-sectional view of the downstream end of a laminar flow element of the present invention.
Figure 3D:
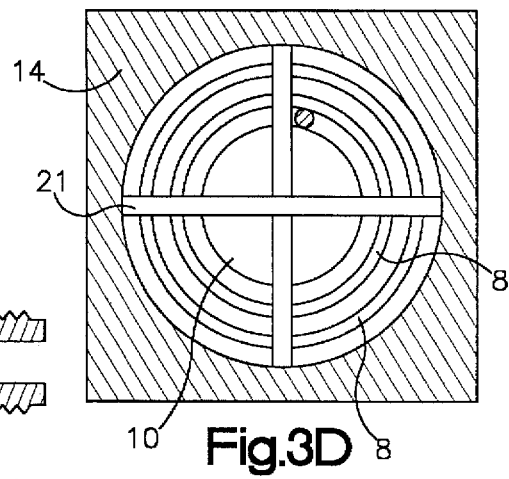
FIG. 3D is an axial view of an end of a laminar flow element of the present invention.

A downstream LFE jig 21, shown from the linear axis a in FIGS. 3C and 3D, is inserted into the upstream end and downstream ends of the laminar flow passages $C_n$ and $C_n$ to coaxially position the laminar flow guides 8 about the LFE plug and to align the LFE with the axis of base cavity 12.

Figure 3E:
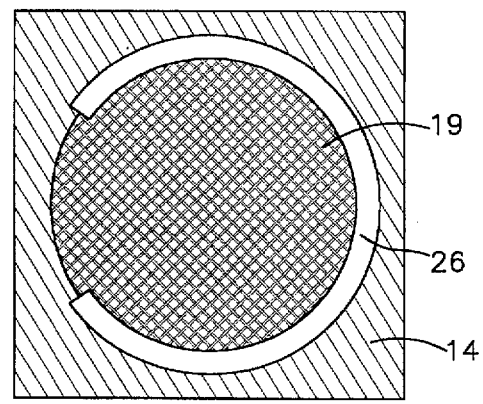
FIG. 3E is an axial view of an upstream end of a laminar flow element of the present invention.

A plug spacing wire 25 extends from the LFE plug to an interior wall of base outlet 15 to maintain proper positioning of the LFE plug along axis α within the base flow passage cavity 12, by axial compression against a C-spring 26 engaged in an annular notch at the upstream end of base cavity 12, as shown along axis α in FIG. 3E. An upstream end cap 27 is sealed within the base cavity by an O-ring 29. A downstream end fitting 28 is, for example, engaged by threads in the outlet end 15 of base 14. The LFE plug 10 and coaxial laminar flow guides 8 are precisely machined to maintain the accuracy of the clearances of the laminar flow passages $c_1$–$c_n$ and to insure that the cross sectional areas of each of the flow passages between upstream sensor tap 22 and downstream sensor tap 23 are constant.

In accordance with the invention, any number of coaxial laminar flow guides can be used in connection with the LFE plug, from zero to infinity. The coaxial laminar flow guides need not be equal in length and the clearance of each flow passage $c_1$–$c_n$ need not be equal. Also, wall thickness of different coaxial laminar flow guides may vary. A greater number of coaxial laminar flow guides is desirable for higher flow rates to insure that laminar flow is introduced to every flow passage.

The incoming gas first passes through the screen disk 19 and screen washer 18 which break up the flow into multiple small flow streams to create a uniform flow field a small distance downstream from screen washer 18. The uniform flow field may then be divided into two or more laminar flow passages $c_1$–$c_n$ by the coaxial laminar flow guides 8. The upstream sensor tap 22 is sufficiently far downstream from the leading edge 35 of the outermost coaxial laminar flow guide so that the nonlinear entrance and orifice effects have become negligible at the upstream sensor tap 22. A small portion of the flow from the outer passage goes through the sensor tube 16, for measurement by appropriate electrical circuitry as is known in the art, connected to sensor tube 16 such as by thermocouple wires 31 and 32. Any type of flow sensor and associated measurement circuitry can be used in connection with the laminar flow element of the invention.

Figure 4A:
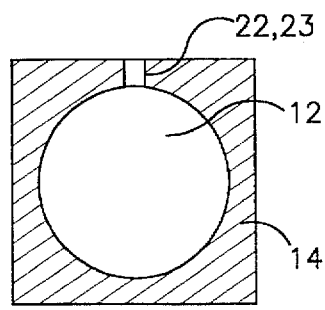
FIGS. 4A and 4B are axial cross-sections of bases, base cavities and sensor taps which can be used in accordance with the present invention.
Figure 4B:
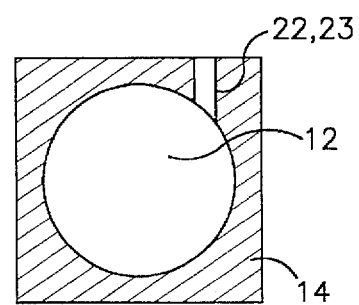
Figure 4C:
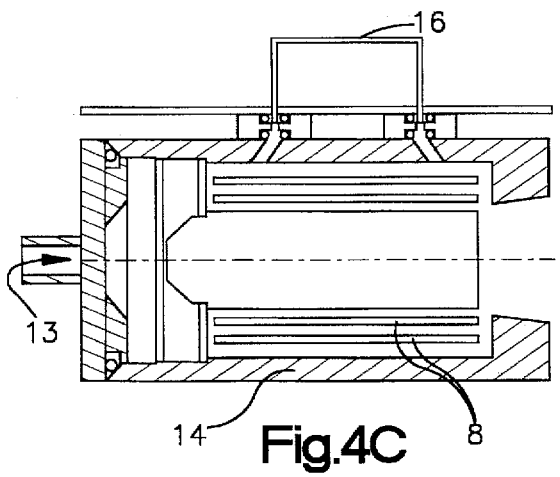
FIGS. 4C and 4D are cross-sections of mass flow meters including LFE constructed in accordance with the present invention.
Figure 4D:
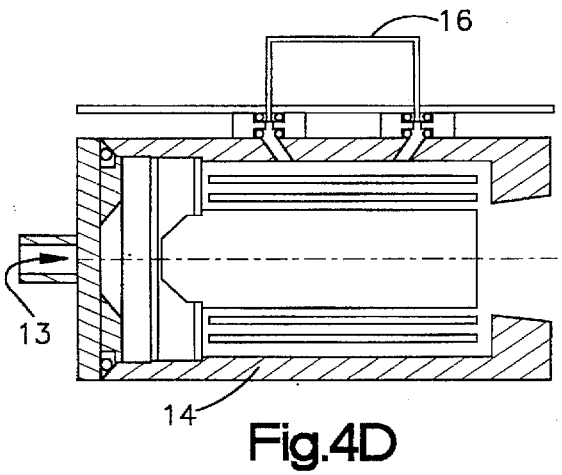

The sensor taps 22 and 23 can be either directly above the base cavity longitudinal axis as shown in FIG. 4A, or offset as shown in FIG. 4B, and can be angled as shown in FIGS. 4C and 4D. In any case, in accordance with the invention the position of the upstream sensor tap 22 is far enough downstream within the base cavity and inboard of the LFE plug and coaxial laminar flow guide(s) so that the distance from the leading edge 35 of the outermost laminar flow guide to the upstream sensor tap 22 is longer than the entrance length estimated from Equation (4).

As defined herein, sensor taps 22 and 23 refer to the fluid passage openings to the sensor tube 16 at interior surface of the base cavity wall.

There are alternative ways to support and center the plug and the tubes. One way is to make dimples precisely on both ends of the laminar flow guides as a means to control the flow clearance of each flow passage, as shown in FIG. 3B.

For the innermost flow passage $C_1$, dimples can be machined from the LFE plug 10.

The screen disk 19 and washer 18 are positioned upstream to act as flow straighteners to make the incoming flow velocity profile uniform. If the distance from the upstream end 5 of LFE plug 10 to the upstream edge of the laminar flow guide closest to end 5 were sufficiently long the flow would become uniform without a screen disk or washer. Either a screen or sufficient distance is required to create uniform flow. Non-uniform flow will cause improper flow division between the laminar flow guides and cause the pressure drop (DP) across LFE to be very sensitive to the upstream condition.

Besides the described use of linear spacing wire 25 at the downstream outlet 15 of base cavity 12 to maintain the exit clearance between the LFE plug 10 and outlet 15, the coaxial laminar flow guides, and the base cavity, a spring or any type of linear spacer to hold the LFE plug and guides in the proper position relative to the sensor taps at the proper places will work.

Because the sensor taps are inboard of the LFE, and the laminar flow passages $c_1-c_n$ are constant cross-sectional area channels, the cross-sectional areas of the laminar flow passages between the upstream tap 22 and downstream tap 23 are constant. Thus, a nonlinear pressure drop due to area change is eliminated.

Figure 5A:
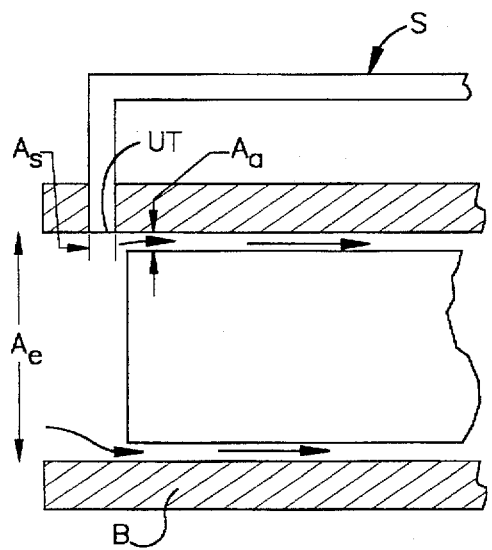
FIG. 5A is a cross-section of a flow entrance area of a flow meter device of the prior art.
Figure 5B:
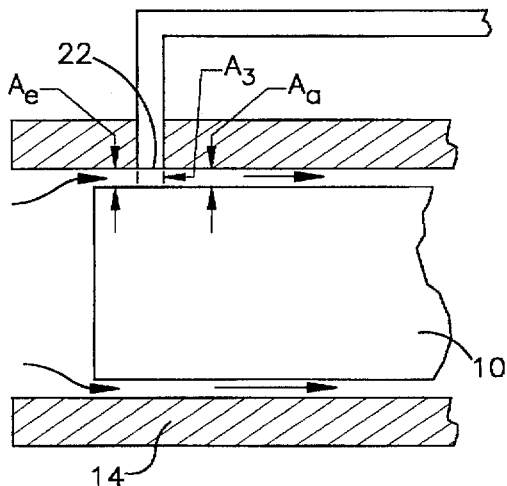
FIG. 5B is a cross-section of a flow entrance area of a flow meter device constructed in accordance with the present invention.

Because the sensor taps 22 and 23 are within the laminar flow region, nonlinear effect due to orifice effect is minimized. FIG. 5A illustrates a flow sensor tapping structure of the prior art wherein the upstream tap of the sensor tube is positioned forward of the LFE, i.e., outside the length of the LFE. FIG. 5B illustrates the present invention wherein the upstream sensor tube tap 22 is positioned downstream of the upstream edge of the LFE, i.e., within the length of the LFE. In FIGS. 5A and 5B, $A_e$, $A_s$ and $A_a$ are, respectively, the cross-sectional area of the entrance, the sensor tube and the laminar flow passage. In the device of FIG. 5A, when gas starts to enter the sensor tube and the laminar flow passage, the cross-sectional area changes from $A_e$ to $A_s$ and $A_o$ dramatically. As explained above, we know that the orifice effect occurs at the joint of two different sized ducts, and it is more significant if the area change ratio is larger. Thus, the orifice effect in FIG. 5A is very significant. However, in the case of FIG. 5B, $A_e/A_s$ and $A_e/A_a$ are much smaller. As a result of the structure of the laminar flow element of the present invention, $DP_o$ is reduced significantly because of the minimized entrance area. ($A_a$).

The entrance effect is eliminated since the distance between the upstream sensor tap 22 and the upstream edge 35 of the outermost laminar flow guide is longer than the entrance length (Le), given by equation (4). For the multiple annular laminar flow guide configuration, the entrance effect is only related to the outer laminar flow passage. In this case, $D_h=2c$; $f=96/R_e$, $u_{max}/V=3/2$ and $k_L$~0.69, where c is the flow clearance of the outer annular passage, $$R_e = \frac{VD_h}{v},$$

V is the gas' mean velocity, $v$ is the gas' kinematic viscosity. Equation (4) can be simplified further in terms of clearance (c) and $R_e$ i.e., $$\frac{L_e}{c} = 0.0116 R_e \quad (6)$$

If there are more than one laminar flow passages $C_1$-Cn the total flow rate Q is a sum of flow rate through each flow passage (see FIG. 6), i.e., $$Q = Q_1 + Q_2 + Q_3 + K. \quad (7)$$

Since the pressure drop (DP) is only an indication of flow rate through the outer flow passage ($Q_3$), a constant flow divisions among the coaxial laminar flow passages is desired. Usually, the flow divisions are determined by the entrance velocity profile, which usually varies. However, if the upstream of the laminar flow guides are positioned sufficiently downstream of the entrance length ($l_e$ in FIG. 6), the flow divisions will be stable since the velocity profile after the entrance length is constant. The use of two screens and the upstream conical tip 11 of the LFE plug 10 also help to reduce the entrance length by improving the flow condition by making the flow profile more uniform.

For a given flow rate, the pressure drop depends on the flow conductance of a LFE, which is measured by its hydrodynamic diameter ($D_h$). For annular flow, $D_h=2c$, which is the highest among all LFE configurations. Thus, for any given flow rate, the annular flow configuration gives the lowest pressure drop. Thus, in a preferred embodiment the cross-sectional configuration of the LFE plug and the coaxial laminar flow guides is generally annular, but could be of any geometric shape such as triangular, polygonal, etc.

Figure 6:
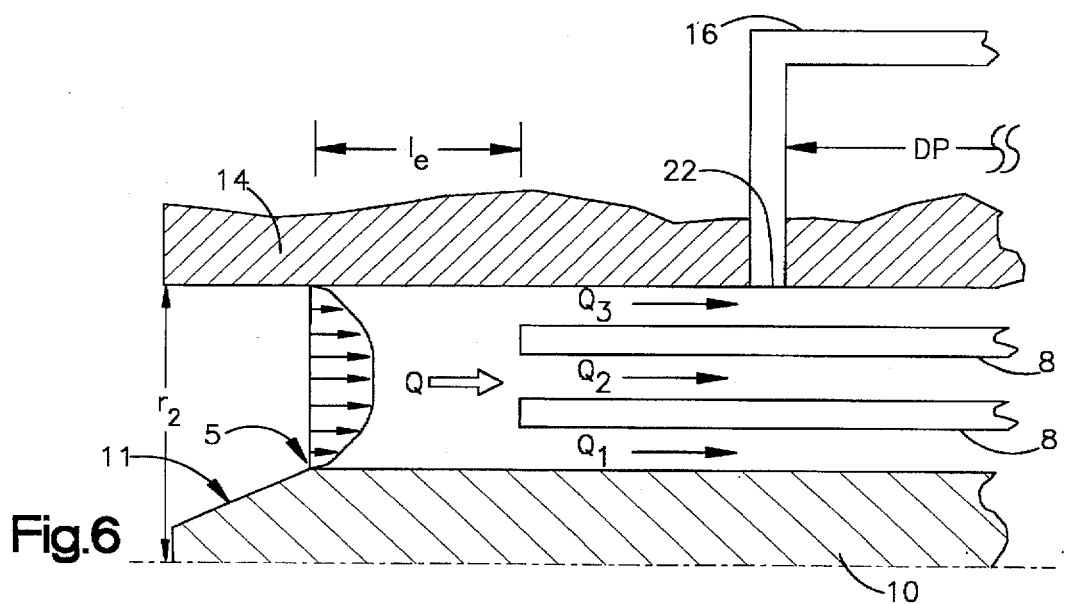
FIG. 6 is a cross-section of flow entrance area of a flow meter device including a LFE with coaxial laminar flow guides constructed in accordance with the present invention.

FIG. 6 illustrates a partial cross-section along the flow direction of a laminar flow element of the invention. For the outer laminar flow $Q_3$, for example, the volumetric flow is:

$$Q = \frac{1}{8\mu} \frac{DP}{L} (r_2^2 + r_1^2 - 2r_{max}^2)A, \quad (8)$$

where DP and L are, respectively, the pressure drop and the spacing between A and B (see FIG. 3); $A=(r_2^2 r_1^2)\pi$ is the annular cross-sectional area, $$v_{max}^2 = \frac{r_2^2 - r_1^2}{2\ln(r_2/r_1)}$$

and $\mu$ is the gas' dynamic viscosity. The Reynolds number is, $$R_e = \frac{2}{\pi v} \frac{Q}{(r_1 + r_2)} \quad (9)$$

Laminar flow requires that Re is below about 2000, which limits the maximum flow rate. MFMs with various flow ranges are realized by changing the number of laminar flow guides and flow passages' clearances. The pressure drop (DP) can be easily adjusted by changing the flow clearance (c).

The invention thus provides an improved laminar flow element for use in flow metering devices to eliminate entrance effect and error due to flow cross sectional area differential to minimize orifice effect and to provide a laminar flow with linear pressure drop across the sensor taps as a function of flow rate.

What is claimed is:

1. A laminar flow element for use with a flow metering device which has an upstream sensor tap and a downstream sensor tap, the laminar flow element comprising:

an LFE plug configured for positioning within a base cavity of a base attached to a fluid flow line, the LFE plug having an upstream end for orientation toward an inlet end of the base cavity, and a downstream end for orientation toward an outlet of the base cavity, the LFE plug having a constant cross-sectional area between the upstream end and the downstream end, a fixture for holding the LFE plug within the base cavity with the upstream end oriented toward a flow direction and to provide a laminar flow passage between the LFE plug and interior walls of the base cavity between the upstream end and the downstream end of the LFE plug, and an upstream sensor tap through a wall of the base into the base cavity, the upstream sensor tap positioned inboard of the LFE plug, and a downstream sensor tap through a wall of the base into the base cavity, the downstream sensor tap positioned inboard of the LFE plug and downstream of the upstream sensor tap, wherein the cross-sectional area of the flow passage between the upstream sensor tap and the downstream sensor tap is constant.

2. The laminar flow element of claim 1 wherein the upstream sensor tap is positioned a distance from the upstream end of the LFE plug which is greater than an entrance length required to establish stable laminar flow.

3. The laminar flow element of claim 1 further comprising at least one coaxial laminar flow guide coaxially disposed about the LFE plug within the base cavity.

4. The laminar flow element of claim 3 wherein the upstream end of the coaxial laminar flow guide is inboard of the upstream end of the LFE plug.

5. The laminar flow element of claim 4 further comprising a conical tip which projects from the upstream end of the LFE plug, and a screen washer and screen disk disposed about the conical tip.

6. The laminar flow element of claim 3 wherein an upstream edge of an outermost coaxial laminar flow guide is upstream of the upstream sensor tap.

7. The laminar flow element of claim 6 wherein the upstream edge of the outermost coaxial laminar flow guide is upstream of the upstream sensor tap a distance greater than an entrance length required to establish stable laminar flow.

8. A laminar flow element comprising a laminar flow element plug having a longitudinal axis and an upstream end and a downstream end, and at least one laminar flow guide positioned about and coaxial with the laminar flow element plug, and at least one spacer between the laminar flow element plug and the laminar flow guide and a conical tip at the upstream end and coaxial with the laminar flow element plug.

9. The laminar flow element of claim 8 further comprising a jig attached to the laminar flow element plug and attached to the laminar flow guide.

10. The laminar flow element of claim 8 further comprising a screen disk and screen washer about the conical tip.

11. A flow metering device comprising:

a base having a base cavity and an inlet and an outlet to the base cavity, the base inlet and outlet connectable to a flow passage, a laminar flow element plug positioned within the base cavity and along a longitudinal axis of the base cavity to define a flow passage between the laminar flow element plug and interior walls of the base cavity, the laminar flow element plug having an upstream end and a downstream end, the upstream end oriented toward the inlet of the base cavity, and the downstream end oriented toward the outlet of the base cavity, an upstream sensor tap and a downstream sensor tap to the base cavity, the upstream sensor tap positioned in the base at a point between the upstream end and the downstream end of the laminar flow element plug, and the downstream sensor tap positioned in the base at a point between the upstream end and the downstream end of the laminar flow element plug, and means for sensing a pressure drop between the upstream sensor tap and the downstream sensor tap.

12. The flow metering device of claim 11 wherein the cross-sectional area of the flow passage from the upstream sensor tap to the downstream sensor tap is constant.

13. The flow metering device of claim 11 further comprising at least one coaxial laminar flow guide positioned coaxially about the laminar flow element plug within the base cavity whereby at least two separate cross-sectional flow passages are provided from the upstream end of the laminar flow element plug to the downstream end of the laminar flow element plug.

* * * * *